F. H. JOHANSSON.
SAWING MACHINE FOR SHORT BOARDS.
APPLICATION FILED JUNE 26, 1914.
1,150,601.
Patented Aug. 17, 1915.
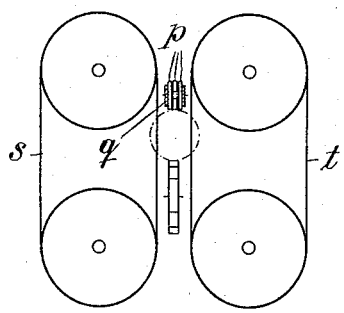
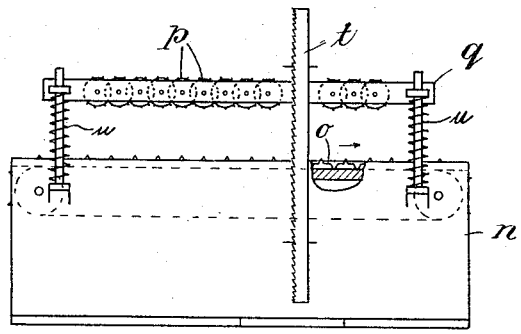
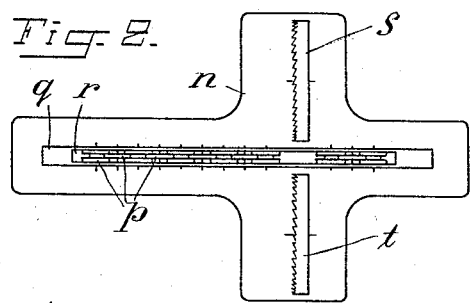
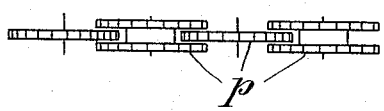
Inventor
Frans Hugo Johansson
By
Attorneys

UNITED STATES PATENT OFFICE.

FRANS HUGO JOHANSSON, OF KARLSTAD, SWEDEN.

SAWING-MACHINE FOR SHORT BOARDS.

1,150,601. Specification of Letters Patent. Patented Aug. 17, 1915.

Application filed June 26, 1914. Serial No. 847,507.

*To all whom it may concern:*

Be it known that I, FRANS HUGO JOHANSSON, engineer, a subject of the King of Sweden, residing at 153 Herrhagen, Karlstad, Sweden, have invented certain new and useful Improvements in Sawing-Machines for Short Boards, of which the following is a specification.

The present invention relates to a sawing machine especially adapted for sawing short blocks into boards, such as used for boxes, cases or the like.

The machine is substantially characterized by the combination of two endless saw blades, an endless carrier for the blocks, arranged between the two adjacent parallel parts of the sawblades, the saw carrier having its upper part supported, a series of presser rollers arranged above the carrier, the rollers in said series, which extends from a point at the front of the saw blades to a point at the rear thereof, lying very near each other, the rollers as well as the carrier being provided with points or the like.

In the accompanying drawings, Figures 1, 2, and 3 are respectively a side view, a plan view, and an end view of the machine. Fig. 4 is a diagrammatic detail view of the arrangement of the rollers.

Referring more particularly to the drawing, $n$ indicates the stationary base or frame, on the upper plane surface of which the upper part of an endless carrier $o$ is running. $p$ indicates pressure rollers, which are mounted very near each other in a frame $q$, which is arranged above the carrier and provided with a longitudinal space or recess for the rollers. Preferably two adjacent rollers entering each other, the one roller being provided with an annular groove, into which the other roller projects. By this arrangement the distance between the points of engagement of the block and the rollers will be very slight. The carrier as well as the rollers are provided with points, which enter into the block, so that this latter is surely fed forward by the movement of the carrier in the direction of the arrow (Fig. 5). The frame $q$ is movable vertically within certain limits and is held pressed downward by means of springs such as $u$. Eventually the frame can be fixed and the rollers each movable vertically and spring-actuated. On each side of the rod-shaped frame $q$ and the carrier the two endless saw-blades $s$, $t$ are mounted in such a way, that their adjacent parts are parallel and lie in the path for the blocks, fed forward on the carrier. The distance between the said adjacent parts of the endless sawblades is for instance, such, that there is sawed out from the block a middle piece of a thickness, which is twice as great as the desired board-thickness. The saw blades are of course driven in such a way, that the two adjacent parts thereof, which work in the block, are running in opposite directions. The carrier consists preferably of a single endless chain, running between the adjacent parts of the saw blades and into guides on the base frame $n$.

Having now particularly described and ascertained the nature of my said invention and in what manner the same is to be performed I declare that what I claim is:—

1. Machine for sawing short blocks into boards, characterized by the combination of two endless sawblades, an endless carrier for the blocks, arranged between the two adjacent parts of the sawblades, the said carrier having its upper part supported, a series of presser rollers arranged above the carrier, the rollers as well as the carrier being provided with points or the like, the rollers in said series entering into each other, so that the points of engagement of the rollers with the block will lie very near each other.

2. Machine for sawing short blocks into boards, characterized by the combination of two endless sawblades, an endless carrier for the blocks, arranged between the two adjacent parts of the sawblades, the said carrier having its upper part supported, a series of presser rollers arranged above the carrier, the rollers as well as the carrier being provided with points or the like, the rollers in said series entering into each other, so that the points of engagement of the rollers with the block will lie very near each other, the rollers being mounted in a frame, movable vertically.

In testimony whereof I have affixed my signature in presence of two witnesses.

FRANS HUGO JOHANSSON.

Witnesses:
G. BOHR,
GRETA PRIEN.